United States Patent

[11] 3,538,969

[72] Inventor James P. Cox
 Milwaukie, Oregon
[21] Appl. No. 707,152
[22] Filed Feb. 21, 1968
[45] Patented Nov. 10, 1970
[73] Assignee John Inglis Frozen Foods Company
 Modesto, California
 a corporation of California

[54] MACHINE FOR TRIMMING PROJECTIONS FROM GLOBULAR ARTICLES
 12 Claims, 5 Drawing Figs.
[52] U.S. Cl. ................................................. 146/81, 146/55
[51] Int. Cl. ............................................... A23n 15/02
[50] Field of Search ................................... 146/81, 83, 55

[56] References Cited
 UNITED STATES PATENTS
 2,342,358 2/1944 Minera .................. 146/55
 3,388,731 6/1968 Reisterer et al. .......... 146/55X
 3,400,740 9/1968 Akesson .................. 146/55X Primary Examiner—Andrew R. Juhasz
Assistant Examiner—Z. R. Bilinsky
Attorney—Robert W. Beach ABSTRACT: By engagement of pad means with the upper side of a globular article, it is rolled along guideways in a compound rotation, which periodically moves a projection of the article through the slot of the guideways. Such compound rotation in one form is effected by moving a pad above linear guideways in a direction generally lengthwise of the guideways while the guideways are oscillated transversely of their lengths. Knife blades are rotated closely beneath the guideways to sever projections of articles extending through the slot of the guideways. The knife blades are adjustable to vary the spacing between them and the bottom of the guideways to regulate the trimming of the projections.

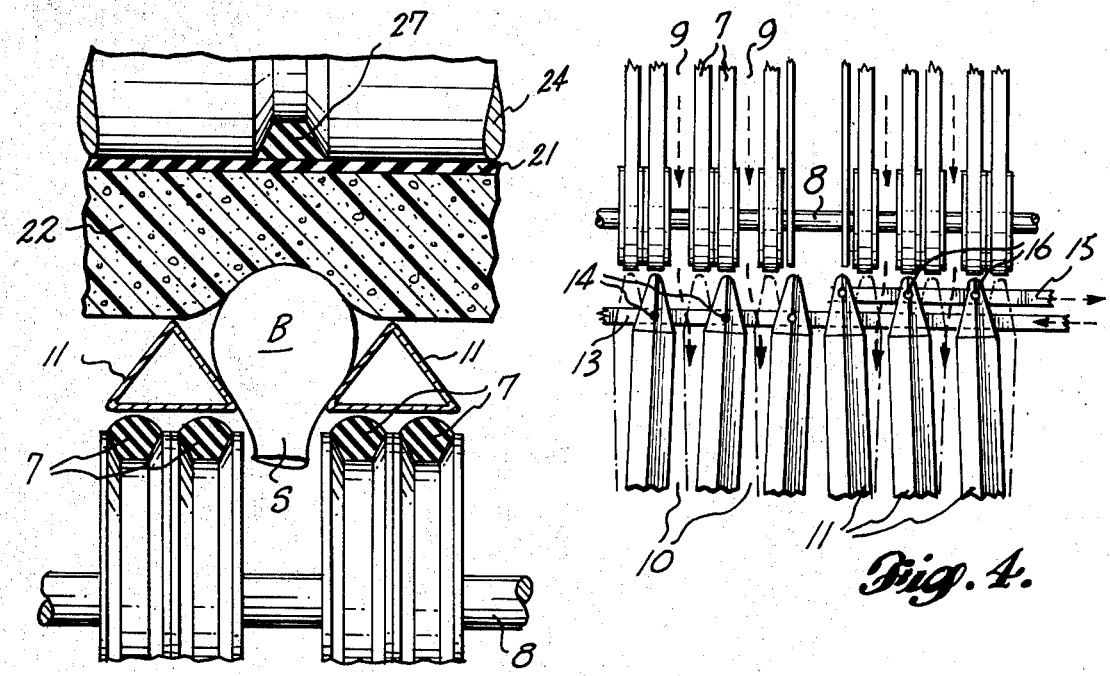
Fig. 4.
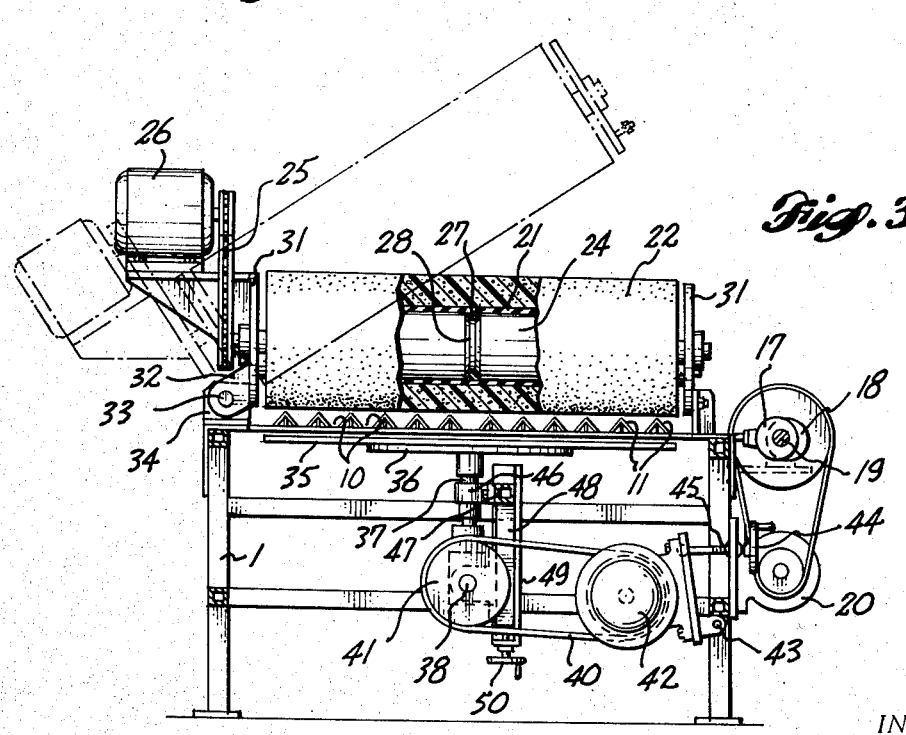
Fig. 5.
Fig. 3.
INVENTOR.
JAMES P. COX
BY
Robert W. Beach
ATTORNEY Patented Nov. 10, 1970
3,538,969
Sheet 1 of 2
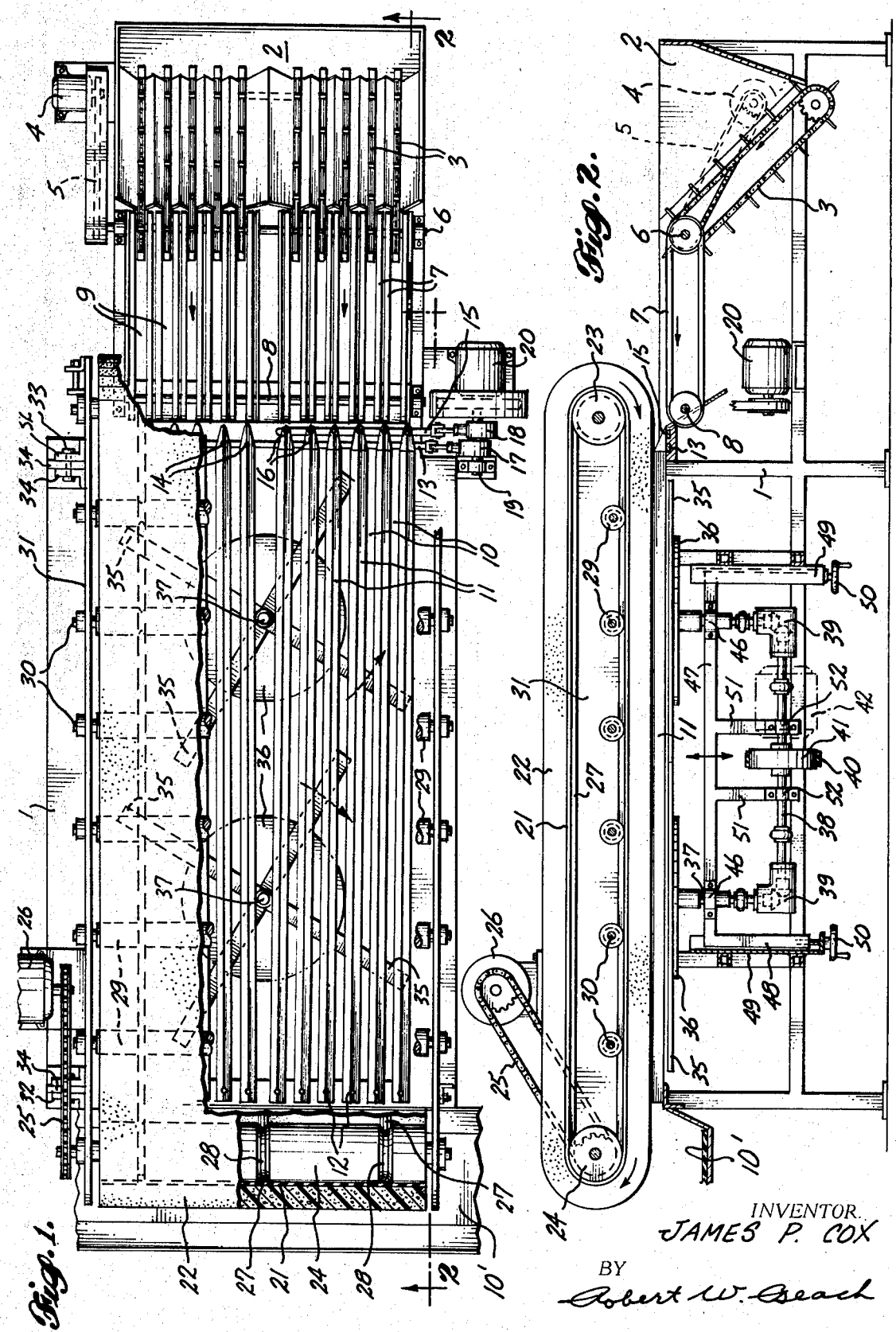
INVENTOR.
JAMES P. COX
BY
Robert W. Beach
ATTORNEY

MACHINE FOR TRIMMING PROJECTIONS FROM GLOBULAR ARTICLES

Brussels sprouts are globular articles, the bodies of which are generally spherical or elongated lengthwise of the stem, to a greater or lesser extent, in the shape of an ellipsoid. The stem projection varies in length and its end is usually more or less uneven or ragged. Heretofore, the stems of such Brussels sprouts have been trimmed by hand manipulation, which has required at least that each Brussels sprout be picked up individually in effecting a stem-trimming operation.

The principal object of the present invention, therefore, is to provide a machine for trimming projections from globular articles, such as the stems of Brussels sprouts, automatically, reliably, and uniformly, so that it is not necessary to manipulate manually each individual article, either during the trimming operation or prior thereto, for the purpose of orienting the article in the proper position for a subsequent trimming operation.

Another object is to provide a machine which will trim projections from globular articles automatically, irrespective of minor variations in shape of the article from generally spherical to ellipsoidal and irrespective of variations in size of such articles within predetermined limits.

It is also a preferred object to provide such a machine which can be adjusted to accommodate articles of different size ranges.

Another object is to provide a machine for trimming projections of globular articles, such as Brussels sprouts, which, while effective, will engage and handle the articles gently so as to avoid or minimize injuring the Brussels sprouts by the necessary manipulation of them.

A particular object is to accomplish the projection-trimming operation by placing the globular article relative to the slot of a machine so that the projection extends through the slot for engagement by a projection-trimming device at the side of the slot opposite the article.

FIG. 1 is a plan of a preferred type of projection trimming machine with parts broken away.

FIG. 2 is a longitudinal section through such machine taken on line 2-2 of FIG. 1.

FIG. 3 is an end elevation of such machine having parts broken away.

FIG. 4 is a fragmentary detail plan of a portion of the machine shown in FIGS. 1, 2 and 3. FIG. 5 is an enlarged transverse vertical section of a portion of the machine shown in FIGS. 1 to 3, showing detail structure of the machine.

There is no appreciable problem in trimming projections of globular articles, such as the stems of Brussels sprouts, if such stems can be positioned predictably with relation to suitable projection-trimming means. The difficult problem is to arrange for placement of such articles without individual manual manipulation so as to position the projections reliably and automatically for engagement by the trimming means. Conveniently, the projection of a globular article can be located by a slot having trimming means at one side of it. The objective then is to orient each globular article automatically so that its projection is placed in registry with such slot and is then extended through the slot into position for engagement by the trimming means.

In the machine shown in FIG. 1 to 5, its various components are mounted on a frame 1. The articles to be trimmed, such as Brussels sprouts, are dumped into a hopper 2 at one end of the machine, from which they are elevated automatically and fed to the remainder of the machine by finger-flight elevating conveyor chains 3 driven by a motor 4 through chain 5 which turns the drive shaft 6 for such conveyor. Such elevating conveyor dumps the articles onto the transfer belt conveyor. Such conveyor extends between pulleys on drive shaft 6 and on the shaft 8 at the opposite end of the conveyor.

A pair of conveyor belts 7 of the transfer conveyor is provided for each elevating conveyor chain 3 emerging from the hopper 2. The belts of each pair are spaced apart to provide a slot 9 between them, as illustrated best in FIG. 4. The articles are supported by spaced engagement of the belts 7 of each pair with such articles and the slot between the belts of each pair will accommodate a projection from an article if such projection should happen to be in registry with and projecting through a slot 9.

The slots 9 of the transfer conveyor are generally aligned with slots 10, respectively, between guide rails 11, which cooperate to form slotted guideways. As shown best in FIGS. 4 and 5, the guide rails 11 are generally horizontal and are tapered upwardly to form ridges elongated lengthwise of the guideways. The slots 10 between such guide rails flare upwardly corresponding to the upward taper of the guide rails themselves transversely of their lengths. The guide rails are spaced apart sufficiently to form slots 10 of a width adequate to receive a projection of a globular article, such as the stem S of a Brussels sprout B as indicated in FIG. 5. Preferably the feed ends of the rails 11 are tapered to facilitate movement into the spaces between such rails of articles supplied to them by the transfer conveyor belts 7.

The guide rails 11 are arranged in two groups of six rails each, disposed in parallel relationship with their lengths extending lengthwise of the frame 1 as shown in FIG. 1. The discharge ends of such rails are mounted on pivots 12, respectively, for swinging of such rails about these pivots. The feed ends of such rails of the two groups are supported independently. The feed ends of the rails of one group are supported by a reciprocable bar 13 to which the feed ends of the rails are attached by pivots 14, respectively. The feed ends of the rails in the other group are supported by a second bar 15 parallel to bar 13 and the rails of the second group are attached to bar 15 by pivots 16, respectively.

Reciprocation of each of the bars 13 and 15 will displace the feed ends of the respective rail groups transversely of the length of such rails. Longitudinal movement of either of the bars 13 and 15 will shift the corresponding ends of the corresponding group of rails so that the rails of such group will swing about their discharge end pivots 12. It is preferred that the movement of the supporting bars 13 and 15 be restricted sufficiently so that the tapered feed ends of the several guide rails do not move into registry with slots 9 between the belts 7 of the transfer conveyor to any appreciable degree. The extent of swinging movement of the guide rails permissible is illustrated in FIG. 4 between the solid-line positions and the broken-line positions.

It is not necessary that the swinging of any two guide rails 11 forming a slot 10 between them be coordinated with the swinging of any other guide rail, except that in a number of instances an article-receiving slot 10 is formed on each side of a particular guide rail. Consequently, it is necessary to move simultaneously as many guide rails as required to maintain the widths of the slots 10 constant. In the particular arrangement shown in FIG. 1, there are six guide rails 11 in each of the two groups which cooperate to form five slots 10 in each group. All of the guide rails in each group are, therefore, mounted to be swung simultaneously by reciprocation of the bars 13 and 15, respectively. It is not necessary that the reciprocation of such bars be coordinated, but it is convenient to drive them for lengthwise reciprocation by the same drive mechanism.

The mechanism used to reciprocate the two slide bars 13 and 15 are eccentrics 17 and 18, respectively, mounted on the drive shaft 19, which is rotated by motor 20, through a suitable pulley and drive belt arrangement shown best in FIG. 3. The strokes of the eccentrics, preferably, are in opposite directions at any given time to reduce the vibration of the machine. Also, the length of the stroke of the bars produced by such eccentrics is that required to effect the oscillation of the guide rails 11 between the solid-line positions and the broken-line positions shown in FIG. 4. While variable-speed drive mechanism can be employed to enable the speed of reciprocation of the bars 13 and 15 to be regulated, the best results have been found to be obtained at an oscillating frequency of about 450 strokes per minute, 225 of such strokes being in each direction.

Over the several guideways formed by the groups of parallel guide rails is positioned pad means engageable with globular articles on the guideways. In the form of apparatus shown in FIGS. 1, 2, 3 and 5, the pad means includes a flexible fabric backing endless belt 21 to the exterior surface of which is bonded readily deformable resilient foam material 22. This foam material, as indicated in FIG. 5, is sufficiently soft as to be depressed readily by engagement with a Brussels sprout and is sufficiently resilient to recover its initial shape immediately upon moving out of contact with the Brussels sprout. Also, such resilient foam layer is sufficiently strong and stretchable as to enable the resilient pad layer to be bent around the end rollers 23 and 24 supporting opposite ends of the belt loop without damage or deterioration.

The composite belt, including the backing or carrier belt layer 21 and the resilient pad surface layer 22, can be driven by turning roll 24 by a chain 25, which is driven by motor 26. Preferably, this belt is driven at a speed at least somewhat greater than the speed of transfer belts 7 to cause a rotating effect on the globular articles, occasioned by contact of the pad layer 22 with them which effects rolling of the articles along the guideways. Actually, it is desirable for the movement of the surface of belt pad 22 to be approximately twice as great as the speed of movement of transfer belts 7. The speed of the belt pad surface may be within the range of 60 to 400 feet per minute, which variation can be accomplished by the motor 26 being of the variable-speed type.

In order to maintain the composite belt 21, 22 centered with respect to its supporting rolls 23 and 24 transversely of the direction of travel of the belt, it is desirable to bond to the interior surface of the carrier belt layer loop one or more V-belts 27, which engage, respectively, in circumferential grooves 28 of the rollers 23 and 24. Also, the lower stretch of such belt is held down in relation to the guideways by holddown rollers 29 carried by shafts 30, the ends of which project through opposite side plates 31 of the upper frame. The rollers 29 are of the idler type and have grooves in their peripheries to fit over the V-belt ribs 27 projecting from the inner face of the carrier belt layer so that such idler rolls will bear directly against such carrier belt layer.

In order to afford easy access to the guideways formed by the guide rails 11, while, at the same time, being able to position the belt pad 22 in close proximity to the guideways, the upper frame of the machine, including side plates 31, is mounted on ears 32, projecting from one of such side plates as shown in FIGS. 1 and 3. These ears are connected by pivot pins 33 to lugs 34 carried by the upper side of lower frame 1. The belt 21, 22 and the entire upper frame section can be swung upward about the pivots 33 from the full-line position, shown in FIGS. 1, 2 and 3, into the broken-line position of FIG. 3. With the upper frame component in this position, the guide rails 11 and reciprocating bars 13 and 15 can be serviced, repaired or replaced readily.

Rotary trimming blades 35 mounted on disks 36, which turn about upright shafts 37, are mounted close beneath the guide rail 11, as shown in FIGS. 1, 2 and 3. While the number of blades mounted on each plate and the spacing of the upright shafts can vary according to design requirements, a convenient arrangement, as shown in FIG. 1, is to provide two rotary blade devices, each having blades of a length exceeding one-half the length of a guide rail 11. The shafts 37 are then located closer together than the diametral length of a complete blade, but farther apart than a radial blade length. The rotary shafts 37 are then interconnected by a drive shaft 38 through bevel gears 39, which are synchronized so that as the shaft 8 is turned, the blade rotors will turn in opposite directions and the blades 35 of the two rotors will be interdigitated as they revolve.

Drive shaft 38 for the rotors can be turned by a belt 40 encircling a pulley 41 on the drive shaft 38 and a second pulley which is driven by an electric motor 42. It is preferred that the motor be of the variable-speed type or that it drive a variable-speed transmission to shaft 38 so that the speed of rotation of the knife rotor shafts 37 can be varied within the range from 500 to 1800 r.p.m.

As shown best in FIG. 3, the motor 42 can be mounted for such movement as may be required to tighten belt 40 satisfactorily irrespective of the position of pulley 41. The motor base is shown as being connected to the frame 1 by a pivot 43 about which the motor base can be swung by turning an adjusting crank 44 to move longitudinally bolt 45 connected to the base of motor 42 at a location spaced from pivot 43. Swinging of the motor base about its mounting pivot will move the motor and its pulley toward or away from pulley 41 on shaft 38 to whatever extent may be desired.

In order to vary the extent to which projections of globular articles on the guideways are trimmed, it is desirable to mount the trimming blade rotors so that they can be raised or lowered. To provide for such adjustment, bearings 46 for rotor shafts 37 are secured to the horizontal top member 47 of a rotor mounting frame. Upright members 48 of such frame at its opposite ends are received in guide channels 49. Such frame end members can be raised or lowered in their respective guide channels by turning crank wheels 50 carrying screws which are threaded into the lower ends of the frame members 48.

The mounting frame for the trimming rotors has central legs 51 extending downward from the upper horizontal member 47, to which bearings 52 supporting drive shaft 38 are secured. Consequently, the entire drive assembly between belt 40 and rotor shafts 37 is supported on the rotor mounting frame for vertical adjustment with it. Any variation in tension of belt 40, which might result from vertical adjustment of the trimming rotors, can be compensated for by varying the position of motor 42 effected by turning the crank wheel 44 as discussed above.

In using the machine described above for trimming the stems of Brussels sprouts, it is desirable first to sort the Brussels sprouts generally according to size in order to achieve the best operation. Brussels sprouts vary in size within the approximate range of three-quarters of an inch in diameter to one and one-half inches in diameter. If the Brussels sprout is of ellipsoidal shape, the length of its major axis in alignment with the stem may be as much as one and one-half times as great as the length of its minor axis, disposed transversely of the stem. The Brussels sprouts may, therefore, be separated as to size generally according to variations in the length of the minor axis.

While the Brussels sprouts could be separated into three groups, namely, small sprouts having a minor axis of less than one inch in length, medium sprouts having a minor axis of a length from one inch to one and one-quarter inches, and large sprouts having a minor axis exceeding one and one-quarter inches, it is preferred that the range of size be confined to a minor axis length variation of three-sixteenths of an inch.

A particular machine of the present invention will be designed or adjusted to trim the stems of Brussels sprouts in a particular size group. The guide rails 11 will be spaced apart a distance appropriate to support the Brussel sprout B substantially as shown in FIG. 5 when its stem S extends downward through a slot between adjacent guide rails. For processing smaller Brussels sprouts the guide rails 11 would be located closer together and for processing larger Brussels sprouts the guide rails would be located farther apart. While the guide rails 11 could be mounted so that the spacing between them could be adjusted, it is preferred for the guide rails to be set for a selected spacing when they are assembled. It is preferred, therefore, that the spacing of the finger flight conveyors 3, the belts 7 of the transfer conveyor and the guide rails 11 be correlated in the manufacture of a particular machine. It is possible, however, to interchange sets of guide rails having different spacings when the upper frame carrying the padded belt 21, 22 has been swung upward about its mounting pivots 33 into the broken-line position of FIG. 3.

The spacing between the knife blade paths and the bottoms of the guideways will also be related to the size of the Brussels sprouts being processed. The hand wheels 50 can be turned to raise or lower shafts 37 supporting the trimming blade rotors as may be necessary to effect the desired trimming of the stems of the Brussels sprouts processed by a particular machine. The important consideration, however, is to be able to place each Brussels sprout B reliably in a position, such as shown in FIG. 5, with its stem S extended through a slot 10 so that a whirling knife blade 35 can trim the stem and sever the roots of the outer leaves as may be necessary to clean up the Brussels sprouts.

The two most important aspects of the problem of trimming the stems of Brussels sprouts are, first, to position automatically each Brussels sprout in a position in which its stem can be trimmed and, second, to effect the trimming operation quickly and neatly. In using a machine of the type shown in FIGS. 1 to 5, therefore, each Brussels sprout must be manipulated so that its stem S will extend downward through a slot 10 in the position illustrated in FIG. 5. Second, when a Brussels sprout has been positioned with its stem thus extending through the slot, the trimming knives must be manipulated to effect a quick and clean cutting action.

In operating the machine shown in FIGS. 1 to 5 inclusive, globular articles with projections, such as Brussels sprouts, are dumped in bulk into the hopper 2. From such a source of supply the articles are fed singly in rows to the stretches of transfer conveyor belts 7 by the finger flight conveyors 3. In being picked out of a mass of Brussels sprouts, it is evident that the Brussels sprouts on the transfer conveyor stretches will not be oriented in any particular attitude. Such random orientation will persist as the upper surface of the Brussels sprouts are engaged by the pad layer 22 of the belt 21, 22. Such engagement will roll the Brussels sprouts off the discharge ends of the transfer conveyor stretches and onto the respective guideways formed by the guide rails 11.

The oscillation of the guide rails 11 coupled with the movement of the conveyor pad 22 lengthwise of the guide rails will effect compound rotation of the Brussels sprouts, one component of such rotation being rolling along the guideways and the other component being transversely of the guideways so as to swing the projecting stems of the Brussels sprouts transversely of the lengths of the slots 10 to 14 bring the projecting stem sooner or later during the gyrations of the sprouts into registry with the slots and to project them through such slots. Thus, the combined effect of the translatory motion of the belt pad and the motion of the guide rails transversely of their lengths effects a gyration of the Brussels sprouts which sporadically projects the Brussels sprout stems down through a slot 10 instead of simply rolling the Brussels sprouts along the guideways as would result from the engagement of the belt pad with the Brussels sprouts if the guide rails 11 were stationary.

As shown in FIG. 1, the shafts 37 of the trimming blade rotors are located between the two sections of guideways. The blades 35 are long enough to extend from the axle entirely across each section of guideways. Except when a blade extends directly perpendicular to the lengths of the guide rails 11, the blade will have a diagonal slicing movement relative to the direction of movement of a Brussels sprout stem instead of a frontal chopping movement. Consequently, each time a blade engages a Brussels sprout stem it will tend to sever the stem cleanly and neatly. The length of guide rails will be such that, in most instances, a stem of a Brussels sprout will extend through a slot 10 a plurality of times during its travel over the complete length of one of the guideways. At the end of the guideways the trimmed Brussels sprouts will be deposited in any suitable receptacle, such as a conveyor 10', the length of which extends transversely of the guideways to be removed from the machine for packaging or other processing.

I claim:

1. A machine for trimming projections from globular articles, comprising a guideway having an elongated slot extending therealong of a width greater than the width of the projection of such a globular article and guiding the article in engagement therewith for movement along said slot, article-engaging means engageable with the globular article lodged in said guideways, moving means effecting relative movement of said article-engaging means and said guideway both lengthwise of and transversely of the length of said slot to roll such article along said guideway lengthwise of said slot and further to turn such article during such rolling for swinging its projection transversely of the length of said slot into registry with and to project it through said slot, and trimming means at the side of said guideway opposite the side thereof engaged by the globular article and engageable with the globular article projection extending through said slot for trimming such projection.

2. The machine defined in claim 1, in which the guideway is generally horizontal and has a slot in the bottom, the article-engaging means includes pad means closely overlying the guideway, and the trimming means includes knife blades rotating closely beneath the guideway and across the slot therein.

3. The machine defined in claim 1, in which the guideway slot is substantially linear and is disposed substantially horizontal.

4. The machine defined in claim 3, in which the article-engaging means includes pad means closely overlying the guideway and the moving means effect movement of said pad means lengthwise of the guideway slot.

5. The machine defined in claim 4, in which the pad means includes an endless flexible belt loop having a thick soft resilient surface layer of sponge plastic material.

6. The machine defined in claim 5, in which the inner side of the belt loop has a rib extending lengthwise of the loop, and a belt roller engaged by the inner surface of the belt loop and having a groove receiving said rib for limiting movement of the belt loop lengthwise of the roller by engagement of said rib with said roller groove.

7. A machine for trimming projections from globular articles, comprising a generally horizontal guideway having a substantially linear slot extending therealong of a width greater than the width of the projection of such a globular article and guiding the article in engagement therewith for movement along said slot, pad means closely overlying said guideway and engageable with the globular article lodged in said guideway, moving means effecting movement of said pad means lengthwise of said guideway slot to roll such article along said guideway lengthwise of said slot and including reciprocating means for reciprocating said guideway transversely of the length of said slot to turn such article during such rolling for swinging its projection transversely of the length of said slot into registry with and to project it through said slot, and trimming means at the side of said guideway opposite the side thereof engaged by the globular article and engageable with the globular article projection extending through said slot for trimming such projection.

8. The machine defined in claim 7, in which the guideway includes two guide rails, stationary pivots securing corresponding ends of the two rails, and the reciprocating means effects reciprocation of the ends of the guide rails remote from the pivots.

9. The machine defined in claim 1, in which the trimming means include an elongated cutting blade swingable about an axis disposed substantially perpendicular to the plane of the blade.

10. The machine defined in claim 9, and means for adjusting the clearance between the cutting blade and the adjacent side of the slot.

11. The machine defined in claim 1, in which the moving means includes first moving means effecting relative movement of the article-engaging means and the guideway lengthwise of the slot and second moving means effecting relative movement of the article-engaging means and the guideway transversely of the length of the slot.

12. A machine for trimming projections from globular articles, comprising a guideway having an elongated slot extending therealong of a width greater than the width of the projection of such a globular article and guiding the article in engagement therewith for movement along said slot, article-engaging means engageable with a side of the globular article generally opposite said guideway, moving means effecting relative movement of said article-engaging means and said guideway transversely of the length of said slot for effecting movement of the globular article traveling along said guideway so as to swing the article projection transversely of the length of said slot into registry with and to project it through said slot, and trimming means at the side of said guideway remote from said article-engaging means for trimming such projection extending through said slot.